(12) United States Patent
Chen et al.

(10) Patent No.: US 12,040,974 B2
(45) Date of Patent: Jul. 16, 2024

(54) INFORMATION SENDING AND PROCESSING METHODS, NODE, CONTROLLER, AND NON-TRANSITORY COMPUTER-READABLE STORAGE MEDIUM

(71) Applicant: ZTE CORPORATION, Guangdong (CN)

(72) Inventors: Ran Chen, Guangdong (CN); Shaofu Peng, Guangdong (CN); Aihua Liu, Guangdong (CN); Jianzhong Wen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/914,437

(22) PCT Filed: Dec. 14, 2020

(86) PCT No.: PCT/CN2020/136214
§ 371 (c)(1),
(2) Date: Sep. 26, 2022

(87) PCT Pub. No.: WO2021/189973
PCT Pub. Date: Sep. 30, 2021

(65) Prior Publication Data
US 2023/0353492 A1    Nov. 2, 2023

(30) Foreign Application Priority Data

Mar. 25, 2020   (CN) ......................... 202010220471.9

(51) Int. Cl.
*H04L 45/74*    (2022.01)
*H04L 45/00*    (2022.01)
(Continued)

(52) U.S. Cl.
CPC ............. *H04L 45/74* (2013.01); *H04L 45/34* (2013.01); *H04L 45/50* (2013.01); *H04L 69/22* (2013.01)

(58) Field of Classification Search
None
See application file for complete search history.

(56) References Cited

U.S. PATENT DOCUMENTS

| 9,319,312 B2 | 4/2016 | Filsfils et al. |
| 2014/0369356 A1 | 12/2014 | Bryant et al. |

(Continued)

FOREIGN PATENT DOCUMENTS

CN    105210336 A    12/2015

OTHER PUBLICATIONS

WIPO, International Search Report issued on Feb. 24, 2021.
(Continued)

*Primary Examiner* — Jeffrey R Swearingen
(74) *Attorney, Agent, or Firm* — Li & Cai Intellectual Property (USA) Office (57) ABSTRACT

Embodiments of the present disclosure provide an information sending method applied to a node. The method includes: sending capability advertisement information, wherein the capability advertisement information is used for indicating a capability of the node to support compressed SRv6 SIDs. Embodiments of the present disclosure further provide an information processing method, a node, a controller, and a non-transitory computer-readable storage medium.

19 Claims, 7 Drawing Sheets (51) Int. Cl.
*H04L 45/50* (2022.01)
*H04L 69/22* (2022.01)

(56) References Cited

U.S. PATENT DOCUMENTS

2020/0351188 A1* 11/2020 Arora .................. H04L 43/0811
2021/0092053 A1* 3/2021 Filsfils .................... H04L 69/22

OTHER PUBLICATIONS

Li, Z. et al. "Compressed SRv6 network programming," IETF, Feb. 25, 2020.
Ran Chen et al. "IGP extensions for shorter SRv6 SID," IETF, May 11, 2020.
Filsfils, C. et al. "Network programming extension: SRv6 uSID instruction," IETF, Feb. 25, 2020.

* cited by examiner

Send capability advertisement information that indicates a capability of the node to support compressed SRv6 SIDs — S101

C field, indicating that the node supports compressed SRv6 SIDs

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|   LB Length   |   LN Length   |  Fun. Length  |  Arg. Length  |
+-+-+-+-+-+-+-+-+-+-+-+-+-+-+-+-+-+-+-+-+-+-+-+-+-+-+-+-+-+-+-+-+
```

FIG. 14

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type       |    Length     |    Flags      |C|  RESERVED   |
+-+-+-+-+-+-+-+-+-+-+-+-+-+-+-+-+-+-+-+-+-+-+-+-+-+-+-+-+-+-+-+-+
|                      SRv6 SID (16 octets)                     |
+-+-+-+-+-+-+-+-+-+-+-+-+-+-+-+-+-+-+-+-+-+-+-+-+-+-+-+-+-+-+-+-+
```

FIG. 15

INFORMATION SENDING AND PROCESSING METHODS, NODE, CONTROLLER, AND NON-TRANSITORY COMPUTER-READABLE STORAGE MEDIUM

CROSS REFERENCE TO RELATED APPLICATIONS

The present application is based on International Application No. PCT/CN2020/136214, filed on Dec. 14, 2020, which is based upon and claims priority to Chinese Patent Application No. 202010220471.9, filed on Mar. 25, 2020, and the entire contents thereof are incorporated herein by reference.

TECHNICAL FIELD

Embodiments of the present disclosure relates to the field of segment routing technology, and in particular relates to an information sending method, an information processing method, a node, a controller, and a non-transitory computer-readable storage medium.

BACKGROUND

Since an Internet Protocol Version 6 (IPv6) address is relatively long, i.e., 128 bits, an excessive overhead may be involved in encapsulation of a segment routing over IPv6 (SRv6) packet header using an IPv6 address, making it hard for a large amount of existing network hardware to complete reading within one cycle. Therefore, the packet has to be read in a loopback manner, which reduces the throughput by half.

In view of the above, it is desirable to realize support to SRv6 compressed headers by the control plane.

SUMMARY

Embodiments of the present disclosure provide an information sending method, an information processing method, a node, a controller, and a non-transitory computer-readable storage medium.

In a first aspect, an embodiment of the present disclosure provides an information sending method applied to a node, the method including:
  sending capability advertisement information, wherein the capability advertisement information is used for indicating a capability of the node to support compressed segment routing over IPv6 (SRv6) segment identifiers (SIDs).

In some embodiments, the capability of the node to support compressed SRv6 SIDs includes at least one of:
  support to compressed SRv6 SIDs by the node;
  an SRv6 SID compression type supported by the node; or
  a correspondence relationship between SRv6 SID block information and SRv6 types.

In some embodiments, sending the capability advertisement information includes:
  sending the capability advertisement information according to any one of an Interior Gateway Protocol (IGP), a Border Gateway Protocol (BGP), a Path Computation Element Communication Protocol (PCEP), or a Border Gateway-Link State Protocol (BGP-LS).

In some embodiments, the capability advertisement information includes at least one of:
  a compression capability flag;
  an SRv6 compression capability type-length-value (TLV); or
  an SRv6 compression capability sub-TLV.

In some embodiments, sending the capability advertisement information includes sending the capability advertisement information according to an Intermediate System To Intermediate System (ISIS) protocol; the capability advertisement information includes at least one of:
  a compression capability flag in an SRv6 capability sub-TLV of a routing capability TLV; or
  an SRv6 compression capability sub-TLV of the routing capability TLV.

In some embodiments, sending the capability advertisement information includes sending the capability advertisement information according to an Open Shortest Path First (OSPF) protocol; the capability advertisement information includes at least one of:
  a compression capability flag in an SRv6 capability TLV of an OSPFv3 Router Information LSA; or
  an SRv6 compression capability sub-TLV in the SRv6 capability TLV of the OSPFv3 Router Information LSA.

In some embodiments, sending the capability advertisement information includes sending the capability advertisement information according to a Border Gateway-Link State Protocol (BGP-LS); and the capability advertisement information includes at least one of:
  a compression capability flag in an SRv6 capability TLV of an SRv6 node attribute; or
  an SRv6 compression capability sub-TLV in the SRv6 capability TLV of the SRv6 node attribute.

In some embodiments, sending the capability advertisement information includes sending the capability advertisement information according to a Path Computation Element (PCE) protocol; wherein
  the capability advertisement information includes at least one of: a compression capability flag in an SRv6 path computation element capability sub-TLV of an Open message; or an SRv6 compression capability sub-TLV of the Open message;
  or,
  a stateful path computation element request parameters object includes a compressed path ID that is used for indicating a path establishment type as a compressed SRv6 SID path.

In some embodiments, after sending the capability advertisement information, the method further includes:
  receiving SID information sent from a controller; wherein the SID information includes SRv6 SID information; and
  encapsulating a segment routing header according to the SID information.

In some embodiments, the SID information includes SRv6 segment Identifier (SID) and corresponding compression related information;
  encapsulating the segment routing header according to the SID information includes: determining, according to the capability advertisement information, the SRv6 SIDs and the corresponding compression related information, whether to encapsulate a segment routing header with at least some of the SRv6 SIDs compressed.

In some embodiments, determining whether to encapsulate the segment routing header with at least some of the SRv6 SIDs compressed includes:
  determining, in a case that there are a plurality of SRv6 SIDs in a same block and of a same compressed length, to encapsulate a segment routing header with the plurality of SRv6 SIDs compressed;
  or,
  determining, in a case that there are a plurality of SRv6 SIDs in a same block, to encapsulate a segment routing header with the plurality of SRv6 SIDs compressed.

In some embodiments, the SID information includes compressed SRv6 SIDs; and
  encapsulating the segment routing header according to the SID information includes: encapsulating the segment routing header according to at least the compressed SRv6 SIDs.

In a second aspect, an embodiment of the present disclosure further provides an information processing method applied to a controller, including:
  receiving capability advertisement information sent from a node; wherein the capability advertisement information is used for indicating a capability of the node to support compressed SRv6 SIDs; and
  sending SID information; wherein the SID information includes SRv6 SID information.

In some embodiments, the SID information includes SRv6 SIDs and corresponding compression related information.

In some embodiments, the compression related information includes at least one of:
  a compression indication;
  a location of a start SRv6 SID from which the compression information is changed;
  a location of an end SRv6 SID till which the compression information is changed;
  a block length of a locator of each SRv6 SID network node;
  a node ID length of a locator of each SRv6 SID network node;
  a compressed length of each SRv6 SID; or
  a compression correspondence relationship of each SRv6 SID; where the compression correspondence relationship of the SRv6 SID is a correspondence relationship between block lengths of the locator of the SRv6 SID network node and compressed lengths.

In some embodiments, the compression related information includes at least one of the following carried in each SRv6 SID:
  a block length of a locator of the SRv6 SID network node;
  a node ID length of the locator of the SRv6 SID network node;
  a compressed length of the SRv6 SID; or
  a compression correspondence relationship of the SRv6 SID.

In some embodiments, before sending the SID information, the method further includes:
  determining an SRv6 path; and
  compressing at least some of the SRv6 SIDs in the SRv6 path to obtain compressed SRv6 SIDs; and
  wherein sending the SID information includes: sending compressed SID information with the compressed SRv6 SIDs.

In a third aspect, an embodiment of the present disclosure further provides a node, including:
  a first sending module configured to send capability advertisement information, wherein the capability advertisement information is used for indicating a capability of the node to support compressed SRv6 SIDs.

In some embodiments, the node further includes:
  a first receiving module configured to receive SID information sent from a controller; wherein the SID information includes SRv6 SID information; and
  one or more processors configured to encapsulate a segment routing header according to the SID information.

In a fourth aspect, an embodiment of the present disclosure further provides a controller, including:
  a second receiving module configured to receive capability advertisement information sent from a node; wherein the capability advertisement information is used for indicating a capability of the node to support compressed SRv6 SIDs; and
  a second sending module configured to send SID information; wherein the SID information includes SRv6 SID information.

In a fifth aspect, an embodiment of the present disclosure provides a non-transitory computer-readable storage medium storing a computer program thereon which, when executed by a processor, causes any one of the information sending methods described above to be implemented.

In a sixth aspect, an embodiment of the present disclosure provides a non-transitory computer-readable storage medium storing a computer program thereon which, when executed by a processor, causes any one of the information processing methods described above to be implemented.

With the embodiments of the present disclosure, a complete support to the compressed SRv6 SID can be implemented by the control plane, and practical applications of the compressed SRv6 SID can be expanded.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art by describing in detail exemplary embodiments thereof with reference to the attached drawings, in which.

DETAIL DESCRIPTION OF EMBODIMENTS

In order to make those skilled in the art better understand the technical solutions in the embodiments of the present disclosure, the information sending method, the information processing method, the node, the controller, and the non-transitory computer-readable storage medium provided in the embodiments of the present disclosure will be described in detail below in conjunction with the drawings.

Embodiments of the present disclosure will be described more sufficiently below with reference to the accompanying drawings, which may be embodied in different forms and should not be construed as being limited to the embodiments set forth herein. Rather, these embodiments are provided so that the present disclosure will be thorough and complete, and will fully convey the scope of the present disclosure to those skilled in the art.

Embodiments of the present disclosure may be described with reference to plan and/or cross-sectional views in idealized representations of the present disclosure. Accordingly, the example illustrations may be modified in accordance with manufacturing techniques and/or tolerances.

The embodiments of the present disclosure and features thereof may be combined with each other as long as they are not contradictory.

The terminology used herein is for the purpose of describing specific embodiments only and is not intended to limit the present disclosure. As used herein, the term "and/or" includes any and all combinations of one or more of the associated listed items. As used herein, the singular forms "a", "an" and "the" are intended to include the plural forms as well, unless the context clearly indicates otherwise. As used herein, the terms "comprise" and "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

The embodiments of the present disclosure are not limited to the embodiments shown in the drawings, but further include modifications of configurations formed based on a manufacturing process. Thus, the regions illustrated in the figures have schematic properties, and the shapes of the regions shown in the figures illustrate specific shapes of regions of elements, but are not intended to be limitative.

Segment routing (SR) is an extended source routing technology based on the principle of encapsulating a segment list carrying routing information instructions into a a header of a packet (packet header) at a source node (head node), to instruct a subsequent intermediate node how to process the packet so that the packet could be transported through a network along a predetermined path without maintaining state information of the path at the intermediate node.

The SR can implement encapsulation of an Internet Protocol Version 6 (IPv6) address in the data plane, which is called the segment routing over IPv6 (SRv6) technology. According to SRv6, an extended segment routing header (SRH) is defined in the packet header, and the IPv6 address is used as a Segment ID (SID) in SRH.

Figure 11:
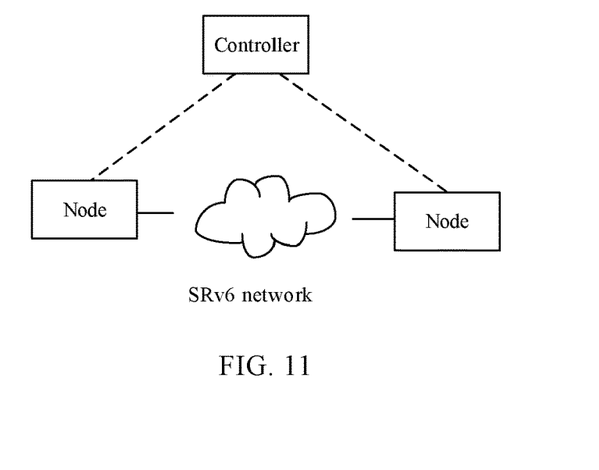
FIG. 11 is a block diagram of an SRv6 network according to an embodiment of the present disclosure.

Referring to FIG. 11, an SRv6 network may include a plurality of nodes, of which at least a head node and a tail node can communicate information with a controller.

Since the IPv6 address is relatively long, i.e., 128 bits, an excessive overhead may be involved in the encapsulation of the SRv6 packet header. For example, when the SRH carries even more than 10 SIDs, a length of the SID list alone exceeds 160 bytes, and for a packet with an average payload of 256 bytes, the encapsulation overhead is about 50%.

Moreover, the excessive encapsulation overhead may further make it hard for a large amount of existing network hardware to complete reading within one cycle, so that the packet has to be read in a loopback manner, which reduces the throughput by half.

In order to reduce the overhead of the packet header encapsulation and the hardware requirement, and improve the forwarding and processing efficiency, some existing technologies propose to compress an SRv6 SID (SRv6 SID) on the forwarding plane, that is, to "compress" the 128-bit SRv6 SID in a certain manner to obtain a compressed SRv6 SID less than 128 bits.

It will be appreciated that since the compressed SRv6 SID is less than 128 bits, the compressed SRv6 SID may also be referred to as a "short ID". In other words, the "compression" may be understood as a format transformation of the SRv6 SID.

Specifically, a standard 128-bit SRv6 SID includes a fixed part such as an address block and a variable part such as a corresponding node ID and a corresponding function ID, and is also referred to as a complete SRv6 SID. In contrast, the compressed SRv6 SID may include merely the variable part of the standard SRv6 SID, for example, include the node ID, the function ID, and optionally Argument, so that the compressed SRv6 SID alone is less than 128 bits, and a length of the compressed SRv6 SID, referred to as "compressed length" of SRv6 SID, is a length of the standard SRv6 SID in a compressed form (the short ID). Further, a plurality of compressed SRv6 SIDs, combined with a common prefix/address block or the like, may form a standard SRv6 SID.

For example, an SRv6 SID compression scheme defines a new uSID (micro SID), which supports dividing a 128-bit IPv6 address (SRv6 SID) into 8 shares, in which a 1st share represents uSID block information, while each of the other 7 shares represents a compression mode of uSID, so that the encapsulation efficiency of the 128-bit SRv6 SID is increased by 7 times.

In order to achieve complete support to the compressed SRv6 SID, it is desirable to realize control plane support to SRv6 compressed SRv6 SIDs.

In a first aspect, an embodiment of the present disclosure provides an information sending method applied to a node.

Referring to FIG. 11, the node in the embodiment of the present disclosure includes nodes in a SRv6 network, of which at least a head node and a tail node can communicate information with a controller.

Figure 1:
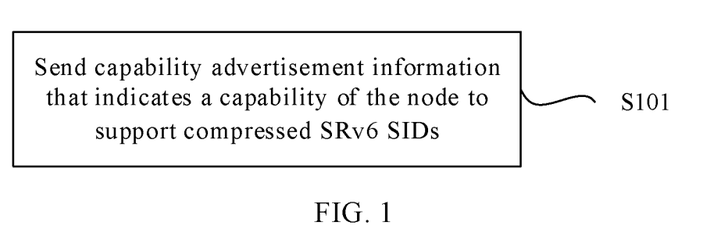
FIG. 1 is a flowchart of an information sending method according to an embodiment of the present disclosure.

Referring to FIG. 1, the method according to the embodiment of the present disclosure includes the following operation S101.

At S101, sending capability advertisement information, wherein the capability advertisement information is used for indicating a capability of the node to support compressed SRv6 SIDs (i.e., a "compression capability" of the node).

A current node (e.g., a head node) sends a specific capability advertisement information to a controller or another node (e.g., an intermediate node) to "advertise" to the controller or another node that the current node itself has a compression capability, that is, a capability of supporting (in other words, processing) a compressed SRv6 SID (or short ID).

Through the capability advertisement information sent from the node, support to the compressed SRv6 SID is achieved in the control plane.

It will be appreciated that nodes in the SRv6 network are substantially equivalent, and the method according to the embodiment of the present disclosure may be implemented at any node. In other words, each node may send the capability advertisement information, or may receive the capability advertisement information from another node. Therefore, each node may serve as a head node in some cases, and as an intermediate node in some other cases.

In some embodiments, sending the capability advertisement information includes: sending the capability advertisement information according to any one of an Interior Gateway Protocol (IGP), a Border Gateway Protocol (BGP), a Path Computation Element (PCE) communication protocol, or a Border Gateway-Link State (BGP-LS) Protocol.

That is, the capability advertisement may be implemented according to any of the above specific protocols, and these listed protocols are merely exemplary, not intending to limit the control plane protocol applicable to the embodiments of the present disclosure.

In some embodiments, the capability of supporting compressed SRv6 SIDs (the compression capability) includes at least one of:
support to compressed SRv6 SID by the node;
an SRv6 SID compression type supported by the node; or
a correspondence relationship between SRv6 SID blocks and SRv6 types.

In view of the above contents, the compression capability may include: support to compressed SRv6 SIDs by the node, which indicates that the node can support compressed SRv6 SIDs; an SRv6 SID compression type supported by the node, which indicates the SRv6 SID compression type(s) that the node can support; or a correspondence relationship between SRv6 SID block information and SRv6 types, which indicates a correspondence relationship between SRv6 SID block information and SRv6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

The above compression capability advertisement can be implemented in the above various formats.

In some embodiments, the capability advertisement information includes at least one of:
a compression capability flag;
an SRv6 compression capability type-length-value (TLV); or
an SRv6 compression capability sub-TLV.

In order to indicate the compression capability of the node in the information, specifically, the protocol may be modified by extending a new flag indicating the compression capability, i.e., a compression capability flag, in an existing TLV or sub-TLV. Specifically, the compression capability flag may be a specific field (Flag).

Alternatively, the protocol may be modified to extend a new compression capability TLV or compression capability sub-TLV that indicates the compression capability.

It will be appreciated that the compression capability flag, the compression capability TLV, and the compression capability sub-TLV are all forms of the capability advertisement information, and each form has no necessarily limited relationship with the content of the compression capability it represents.

Figure 12:
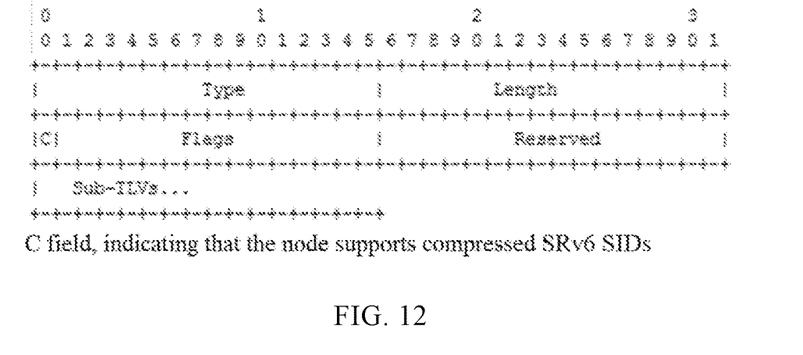
FIG. 12 is a schematic diagram of a TLV format according to an embodiment of the present disclosure.

For example, referring to FIG. 12, a compression capability flag (C field) is included in a TLV, and different values of the C field may indicate whether a node supports compressed SRv6 SIDs, or may further indicate a specific SRv6 SID compression types supported by the node.

As another example, a compression capability sub-TLV may be extended in a TLV, the compression capability sub-TLV being used to indicate that the node supports compressed SRv6 SID, and/or indicate an SRv6 SID compression type supported by the node.

Figure 13:
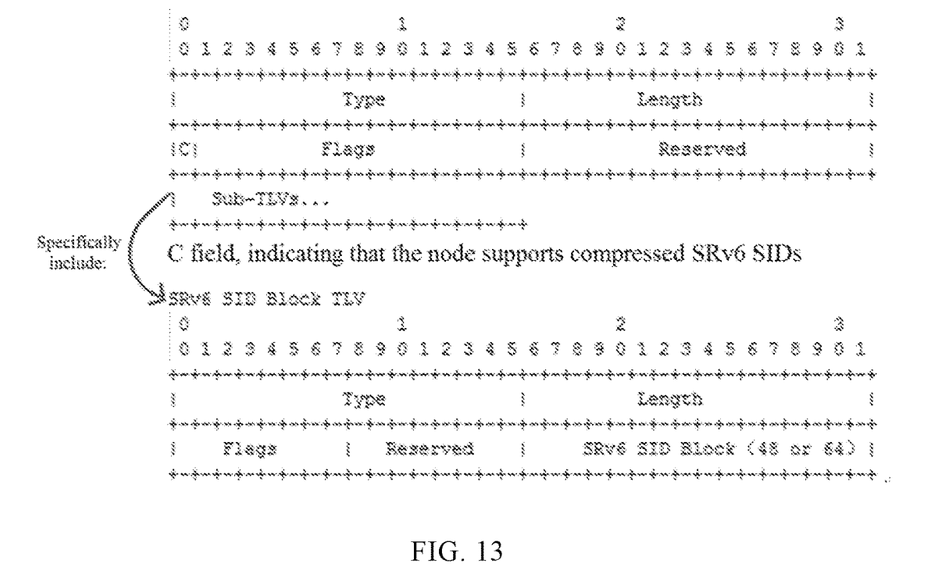
FIG. 13 is a schematic diagram of another TLV format according to an embodiment of the present disclosure.

For another example, referring to FIG. 13, a compression capability sub-TLV may be extended in a TLV to indicate a correspondence relationship between SRv6 SID block information and SRV6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

Meanwhile, in each piece of capability advertisement information, it is possible that merely one (e.g., see FIG. 12, where merely the compression capability flag (C field) is present) or more (e.g., see FIG. 13, where both the compression capability flag (C field) and the SRv6 compression capability sub-TLV are present) of the compression capability flag, the SRv6 compression capability TLV or the SRv6 compression capability sub-TLV are present.

Moreover, when each piece of capability advertisement information contains more than one of the compression capability flag, the SRv6 compression capability TLV or the SRv6 compression capability sub-TLV, different items may represent meanings different from or overlapped with each other.

The following exemplarily describes a specific form of the capability advertisement information when the capability advertisement information is sent according to some of the specific protocols.

In some embodiments, sending the capability advertisement information includes sending the capability advertisement information according to an Intermediate System To Intermediate System (ISIS) protocol; and the capability advertisement information includes at least one of:
a compression capability flag in an SRv6 capability sub-TLV of a routing capability TLV; or
an SRv6 compression capability sub-TLV of the routing capability TLV.

According to the ISIS protocol, the capability advertisement information may specifically include an extended (new) compression capability flag, or an extended (new) SRv6 compression capability sub-TLV, in the SRv6 capability sub-TLV of the routing capability TLV thereof.

For example, the compression capability flag may indicate merely whether a node supports compressed SRv6 SIDs, or may further indicate an SRv6 SID compression type supported by the node.

The SRv6 compression capability sub-TLV may indicates a correspondence relationship between SRv6 SID block information and SRV6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

In some embodiments, sending the capability advertisement information includes sending the capability advertisement information according to an Open Shortest Path First (OSPF) protocol; and the capability advertisement information includes at least one of:
   a compression capability flag in an SRv6 capability TLV of an OSPFv3 Router Information LSA; or
   an SRv6 compression capability sub-TLV in the SRv6 capability TLV of the OSPFv3 Router Information LSA.

According to the OSPF protocol, the capability advertisement information may specifically include an extended (new) compression capability flag, or an extended (new) SRv6 compression capability sub-TLV, in the SRv6 capability sub-TLV of the OSPFv3 Router Information LSA.

For example, the compression capability flag may indicate merely whether a node supports compressed SRv6 SIDs, or may further indicate an SRv6 SID compression type supported by the node.

The SRv6 compression capability sub-TLV may indicates a correspondence relationship between SRv6 SID block information and SRV6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

In some embodiments, sending the capability advertisement information includes sending the capability advertisement information according to a BGP-LS protocol; and the capability advertisement information includes at least one of:
   a compression capability flag in an SRv6 capability TLV of an SRv6 node attribute; or
   an SRv6 compression capability sub-TLV in the SRv6 capability TLV of the SRv6 node attribute.

According to the BGP-LS protocol, the capability advertisement information may specifically include an extended (new) compression capability flag, or an extended (new) SRv6 compression capability sub-TLV, in the SRv6 capability TLV of the SRv6 node attribute.

For example, the compression capability flag may indicate merely whether a node supports compressed SRv6 SIDs, or may further indicate an SRv6 SID compression type supported by the node.

The SRv6 compression capability sub-TLV may indicates a correspondence relationship between SRv6 SID block information and SRV6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

In some embodiments, sending the capability advertisement information includes sending the capability advertisement information according to a PCE protocol; and the capability advertisement information includes at least one of: a compression capability flag in an SRv6 path computation element capability sub-TLV of an Open message; or an SRv6 compression capability sub-TLV of the Open message;

According to the PCE protocol, the capability advertisement information may specifically include an extended (new) compression capability flag, or an extended (new) SRv6 compression capability sub-TLV, in an SRv6 path computation element (PCE) capability sub-TLV in an Open message advertised between a path computation client (PCC) and a PCE.

For example, the compression capability flag may indicate merely whether a node supports compressed SRv6 SIDs, or may further indicate an SRv6 SID compression type supported by the node.

The SRv6 compression capability sub-TLV may indicates a correspondence relationship between SRv6 SID block information and SRV6 types. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

Alternatively, as another manner, a stateful path computation element request parameters object includes a compressed path ID that is used for indicating a path establishment type as a compressed SRv6 SID path.

In other words, for the PCE protocol, a stateful PCE request parameters object (SRP object) is extended, in which a compressed path ID is added to indicate a compressed SRv6 SID path to which a computation path request or result is to be delivered.

Figure 2:
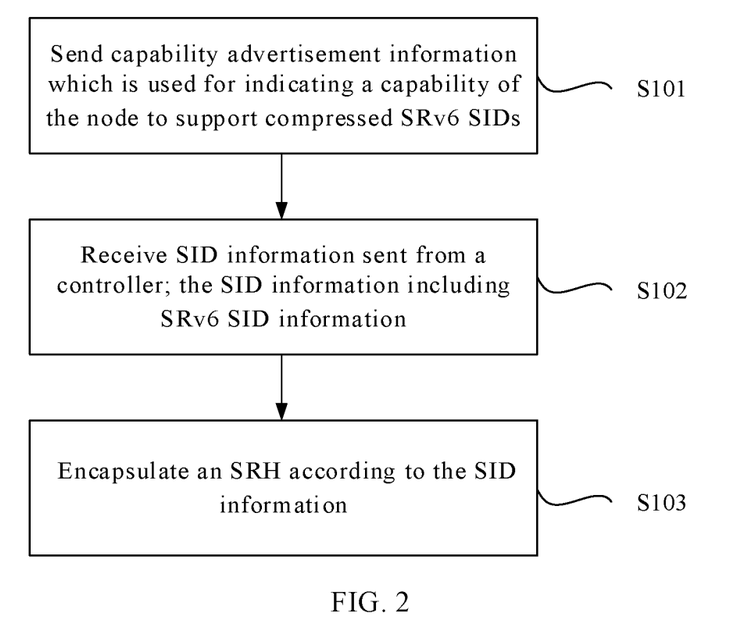
FIG. 2 is a flowchart of another information sending method according to an embodiment of the present disclosure.

Referring to FIG. 2, in some embodiments, after sending the capability advertisement information, the method further includes the following operations S102 to S103.

At S102, receiving SID information sent from a controller. The SID information includes SRv6 SID information.

At S103, encapsulating an SRH according to the SID information.

After sending the capability advertisement information, a node may receive SID information from the controller, where the SID information reflects information of the SRv6 SID (although may differ in the specific form). Therefore, the node can obtain the SRH by encapsulating according to the SID information, and add the SRH into an SR packet before sending the SR packet.

As a manner provided in an embodiment of the present disclosure, SRv6 SIDs in the SID information sent from the controller are all standard (128-bit), but at the same time, information related to compression of these SRv6 SIDs (compression related information) is also contained in the SID information, and in this case, the node performs compression of the SRv6 SIDs.

Figure 3:
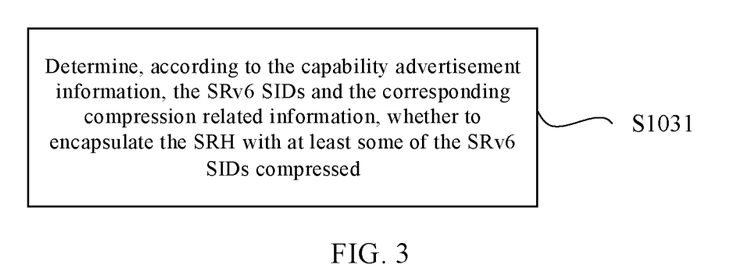
FIG. 3 is a flowchart of some operations in another information sending method according to an embodiment of the present disclosure.

Accordingly, referring to FIG. 3, in some embodiments, the SID information includes SRv6 SIDs and corresponding compression related information. Encapsulating the SRH according to the SID information (S103) includes the following operation S1031.

At S1031, determining, according to the capability advertisement information, the SRv6 SIDs and the corresponding compression related information, whether to encapsulate the SRH with at least some of the SRv6 SIDs compressed.

After receiving a standard SRv6 SID, the node may determine, according to the corresponding compression related information, to encapsulate the SRH with standard SRv6 SIDs or compressed SRv6 SIDs.

Encapsulating the SRH with compressed SRv6 SIDs may be encapsulating the SRH with all the SRv6 SIDs compressed; or encapsulating the SRH with some of the SRv6 SIDs compressed, and others uncompressed. That is, in the resulted SRH, some of the SRv6 SIDs may be compressed, while some other of the SRv6 SIDs may be not compressed.

In some embodiments, determining whether to encapsulate the SRH with at least some of the SRv6 SIDs compressed includes:

judgment criterion 1: determining, in a case that there are a plurality of SRv6 SIDs in a same block and of a same compressed length, to encapsulate the SRH with the plurality of SRv6 SIDs compressed;
or,
judgment criterion 2: determining, in a case that there are a plurality of SRv6 SIDs in a same block, to encapsulate the SRH with the plurality of SRv6 SIDs compressed.

Whether to use compressed SRv6 SIDs, or which SRv6 SIDs are to be compressed specifically, may be determined according to different criteria.

One criterion includes: if a plurality of SRv6 SIDs are in a same block and have a same length after compression (i.e., compressed length), compressing these SRv6 SIDs and then encapsulating them into the SRH. Apparently, it is to be understood that the plurality of SRv6 SIDs here may refer to all the SRv6 SIDs.

Alternatively, another criterion may include: as long as a plurality of SRv6 SIDs are in a same block, compressing these SRv6 SIDs and then encapsulating them into the SRH regardless of the compression length thereof. Apparently, it is to be understood that the plurality of SRv6 SIDs here may refer to all the SRv6 SIDs.

Which criterion is specifically adopted may be determined according to the usage scenario. For example, in a single domain environment, judgment criterion 2 may be used, while in a cross-domain environment, judgment criterion 1 may be adopted.

As a manner provided in an embodiment of the present disclosure, in the SID information sent from the controller, at least some of the SRv6 SIDs are compressed (or in a short format), so the controller can directly encapsulate these compressed SRv6 SIDs into the SRH.

Figure 4:
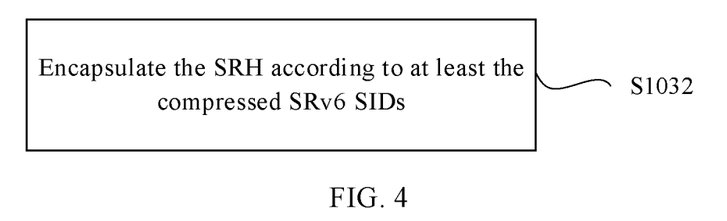
FIG. 4 is a flowchart of some operations in another information sending method according to an embodiment of the present disclosure.

Accordingly, referring to FIG. 4, in some embodiments, the SID information includes compressed SRv6 SIDs; and encapsulating the SRH according to the SID information (S103) includes the following operation S1032.

At S1032, encapsulating the SRH according to at least the compressed SRv6 SIDS.

That is, the already compressed SRv6 SIDs in the SID information may be directly encapsulated by the node.

Apparently, it is to be understood that if the SID information further includes standard SRv6 SIDs, the SRv6 SIDs may be encapsulated in a standard manner, or it may be determined according to S1031 whether to encapsulate the SRv6 SIDs after compression.

In a second aspect, an embodiment of the present disclosure further provides an information processing method applied to a controller.

Referring to FIG. 11, the controller in the embodiment of the present disclosure is a controller in a SRv6 network. The SRv6 network includes a plurality of nodes that may communicate information with each other, in which at least a head node and a tail node can communicate information with a controller.

Figure 5:
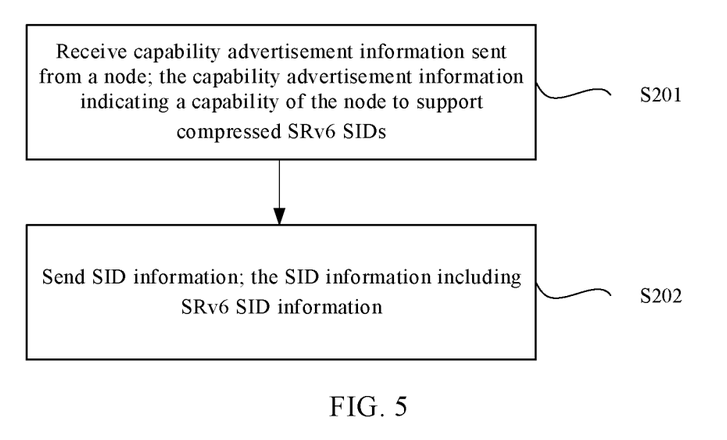
FIG. 5 is a flowchart of an information processing method according to an embodiment of the present disclosure.

Referring to FIG. 5, the method according to the embodiment of the present disclosure includes the following operations S201 to S202.

At S201, receiving capability advertisement information sent from a node; wherein the capability advertisement information is used for indicating a capability of the node to support compressed SRv6 SIDs.

At S202, sending SID information; the SID information including SRv6 SID information.

After receiving the capability advertisement information sent from the node, the controller learns the information that the node can support compressed SRv6 SIDs, so that the controller can send the SID information to the node for encapsulation of an SRH.

As a manner provided in an embodiment of the present disclosure, the controller may send standard SRv6 SIDs to the node, and carry corresponding compression related information at the same time, so that the node may decide whether to encapsulate the SRH with compressed SRv6 SIDs.

Accordingly, in some embodiments, the SID information includes SRv6 SIDs and corresponding compression related information.

In some embodiments, the compression related information includes at least one of:
a compression indication;
a location of a start SRv6 SID from which the compression information is changed;
a location of an end SRv6 SID till which the compression information is changed;
a block length of a locator of each SRv6 SID network node;
a node ID length of a locator of each SRv6 SID network node;
a compressed length of each SRv6 SID; or
a compression correspondence relationship of each SRv6 SID. The compression correspondence relationship of the SRv6 SID is a correspondence relationship between block lengths of the locator of the SRv6 SID network node and compressed lengths.

Specifically, the compression related information may include the above contents.

The compression indication indicates that the SRH is to be encapsulated with compressed SRv6 SIDs.

Each length represents corresponding length information.

The locator of a network node is an identifier assigned to the network node in a network topology, which indicates location information of the node where a packet is routed and forwarded to the node, and the block is an address block assigned with an SID.

The locations of the start and end SRv6 SIDs where the compression information is changed refer to locations of the SRv6 SIDs where the compression related information is changed, such as start and end locations of the compressed SRv6 SIDs.

The compression correspondence relationship of the SRv6 SID is a correspondence relationship between block lengths of the locator of the SRv6 SID network node and compressed lengths (e.g., a ratio, or a "kind" of relationship).

Each piece of SID information may include merely a single compression indication.

In contrast, the above lengths and compression correspondence relationship may be directed to each SRv6 SID.

The location of the start SRv6 SID from which the compression information is changed and the location of the end SRv6 SID till which the compression information is changed may be independent location information, or may be directed to the corresponding SRv6 SID.

In some embodiments, the compression related information includes at least one of the following carried in each SRv6 SID:
- a block length of a locator of the SRv6 SID network node;
- a node ID length of a locator of the SRv6 SID network node;
- a compressed length of the SRv6 SID; or
- a compression correspondence relationship of the SRv6 SID.

As discussed above, since the above lengths and compression correspondence relationship are directed to each SRv6 SID, they can be carried by each SRv6 SID itself.

Apparently, the specific manner in which each SRv6 SID itself carries the above information may vary.

Figure 14:
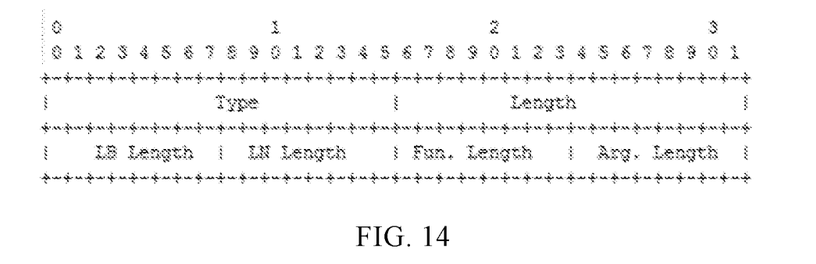
FIG. 14 is a schematic diagram of another TLV format according to an embodiment of the present disclosure.

For example, a compression related information sub-TLV may be extended (added) after each SRv6 SID, and referring to FIG. 14, the compression related information sub-TLV may include the above lengths.

As another example, the compression correspondence relationship of the SRv6 SID may be an identifier directly carried (extended) in the TLV of the SRv6 SID.

In addition, a segment sub-TLV indicating a compression type may be extended in the SID information. The segment sub-TLV carries a standard SRv6 SID, and an extended (new) L field, indicating that the SRv6 SID is a start or end location where the compression information is changed. That is, the specific form of the start or end location identifier for the change of the compression information may be a specific field (e.g., L field) in the segment sub-TLV.

As another manner provided in an embodiment of the present disclosure, the controller may first obtain a compressed SRv6 SID and send the compressed SRv6 SID to the node to encapsulate the SRH directly with the compressed SRv6 SID.

Figure 6:
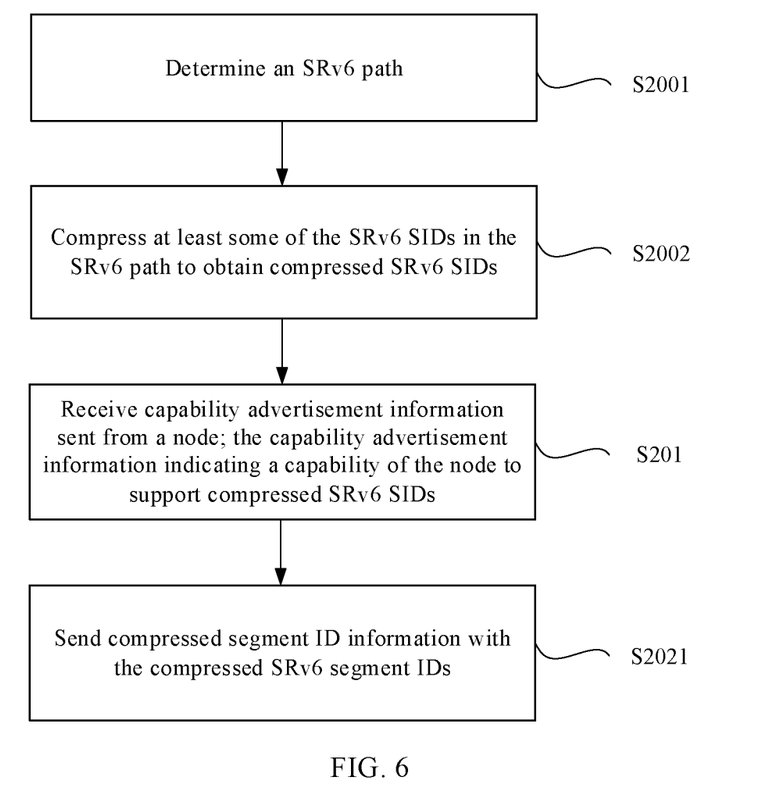
FIG. 6 is a flowchart of another information processing method according to an embodiment of the present disclosure.

Referring to FIG. 6, in some embodiments, before sending the SID information (S202), the method further includes the following operations S2001 to S2002.

At S2001, determining an SRv6 path.

At S2002, compressing at least some of the SRv6 SIDs in the SRv6 path to obtain compressed SRv6 SIDs.

Further, sending the SID information (S202) includes the following operation 2021.

At S2021, sending compressed SID information with the compressed SRv6 SIDs.

The controller collects related information including topology information and topology attributes of the SRv6 network, as well as an SRv6 SID accessibility related attribute, based on which an SRv6 path is computed and at least some of the SRv6 SIDs in the path compression are compressed, and the compressed SRv6 SIDs are sent to the node (such as a head node). Therefore, the SID information sent at this time is the compressed SID information.

Specifically, the controller may collect the related information including the network topology information, the topology attributes, and the SRv6 SID accessibility related attribute through the BGP-LS protocol.

The SRv6 SID accessibility related attribute may actually contain the above compression related information.

Specifically, the controller may send the SID information to the node via the BGP protocol or PCE protocol.

For example, the controller advertises the SID information to the nodes via the BGP protocol.

For example, the controller advertises the SID information to the nodes via the PCE protocol.

Figure 15:
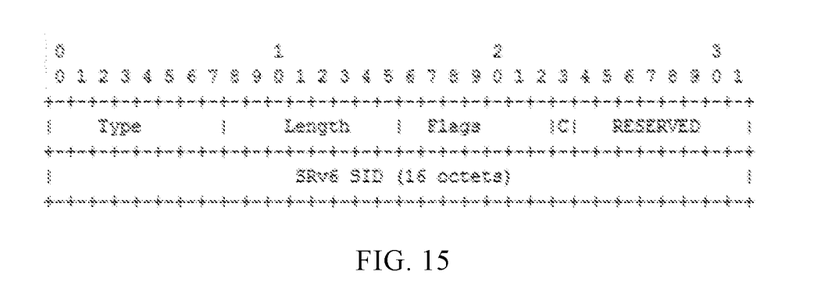
FIG. 15 is a schematic diagram of another TLV format according to an embodiment of the present disclosure.

Specifically, referring to FIG. 15, in the extended PCE protocol, an explicit route object (ERO) carries a compression indication identifier (e.g., C field in the figure) and the compressed SRv6 SID, where the compression indication identifier indicates that the SRv6 SID is compressed.

In some existing technologies, a SR policy implements the traffic engineering intent through a segment list. The segment list encodes any forwarding path of the packet in the network, and the SR policy is identified by a head end-color-end point triple. At a given head end node, the SR Policy is identified by a color-end point tuple.

The SR policy involves at least one candidate path that represents a specific manner of delivering a packet from the corresponding SR policy head end to the end point. Each candidate path has a preference value, and the larger the preference value of the path is, the better. A valid candidate path with the largest preference value is an active candidate path. In other words, the segment list of the SR policy is the segment list of the active path thereof. Each candidate path may have one or more segment lists, each having an associated load balancing weight. The traffic directed to this path is load balanced across all valid segment lists according to the weights.

In the above existing art, the BGP protocol is used to advertise the candidate path of the SR policy to the head node, but not a compressed candidate path of the SR policy.

A specific embodiment of the present disclosure includes the following operations S301 to S303.

At S301, a node advertises SRv6 compression capability.

By sending the capability advertisement information, the node advertises the compression capability thereof to support compressed SRv6 SIDs.

Specifically, the compression capability includes at least one of: support to compressed SRv6 SID by the node, an SRv6 SID compression type supported by the node, a correspondence relationship between SRv6 SID block information and SRv6 types, or the like. For example, the SRv6 types include generalized SRv6 or compressed SRv6, or compressed SRv6 of 16 bits, 32 bits, 64 bits, and the like; and the SRv6 SID blocks may be in the forms of 48 bits, 64 bits, 96 bits, etc.

Specifically, the capability advertisement information includes at least one of: a compression capability flag, an SRv6 compression capability TLV, an SRv6 compression capability sub-TLV, or the like.

At S302, a controller advertises the SRv6 SIDs and corresponding compression related information to a head node.

After receiving the capability advertisement information, the controller sends SID information to the head node.

Specifically, the controller may send a segment list which includes a plurality of SRv6 SIDs, and corresponding compression related information of each extended SRv6 SID.

Specifically, the compression related information includes at least one of: compression indication, a location of a start SRv6 SID from which the compression information is changed, a location of an end SRv6 SID till which the compression information is changed, a block length of a locator of each SRv6 SID network node; a node ID length of a locator of each SRv6 SID network node, a compressed length of each SRv6 SID, or a compression correspondence relationship of each SRv6 SID. The compression correspondence relationship of the SRv6 SID is a correspondence relationship between block lengths of the locator of the SRv6 SID network node and compressed lengths.

At S303, the head node judges whether to encapsulate an SRH with compressed SRv6 SIDs.

Based on the received SID information, the head node determines whether to encapsulate the SRH with compressed SRv6 SIDs.

The specific judgment conditions may include:

judgment criterion 1: determining, in a case that there are a plurality of SRv6 SIDs in a same block and of a same compressed length, to encapsulate the SRH with the plurality of SRv6 SIDs compressed;

or, judgment criterion 2: determining, in a case that there are a plurality of SRv6 SIDs in a same block, to encapsulate the SRH with the plurality of SRv6 SIDs compressed.

Which criterion is specifically adopted may be determined according to the usage scenario. For example, in a single domain environment, judgment criterion 2 may be used, while in a cross-domain environment, judgment criterion 1 may be adopted.

Another specific embodiment of the present disclosure includes the following operations S401 to S403.

At S401, a node advertises SRv6 compression capability.

At S402, a controller advertises the SRv6 SIDs and corresponding compression related information to a head node.

After receiving the capability advertisement information, the controller sends SID information to the head node.

A segment sub-TLV indicating a compression type may be extended in the SID information. The segment sub-TLV carries a standard SRv6 SID, and an extended (new) L field, indicating that the SRv6 SID is a start or end location where the compression information is changed.

At S403, the head node judges whether to encapsulate an SRH with compressed SRv6 SIDs.

Another specific embodiment of the present disclosure may support a single domain or cross-domain scenario, but is generally used in a cross-domain scenario, and specifically includes the following operations S501 to S505.

At S501, the controller receives the capability advertisement information sent from the node.

At S502, the controller collects related information including topology information and topology attributes of the SRv6 network, as well as an SRv6 SID accessibility related attribute.

Specifically, the controller may collect the related information including the network topology information, the topology attributes, and the SRv6 SID accessibility related attribute through the BGP-LS protocol.

The SRv6 SID accessibility related attribute may actually contain the above compression related information.

At S503, based on the collected related information including topology information and topology attributes of the SRv6 network, as well as the SRv6 SID accessibility related attribute, the controller computes a SRv6 path and compress at least some of the SRv6 SIDs in the path compression.

At S504, after computing the path, the controller sends compressed SID information containing the compressed SRv6 SID to the head node through the BGP protocol or PCE protocol.

For example, the controller advertises the SID information to the nodes via the BGP protocol.

For example, the controller advertises the SID information to the nodes via the PCE protocol.

Specifically, referring to FIG. 15, in the extended PCE protocol, an ERO carries a compression indication identifier (e.g., C field in the figure) and the compressed SRv6 SID, where the compression indication identifier indicates that the SRv6 SID is compressed.

At S505, the node encapsulates the SRH according to at least the compressed SRv6 SID.

Another specific embodiment of the present disclosure is applied to the case where the compressed SRv6 SID is a 32-bit short identifier, and a forwarding device (intermediate node) needs to learn a correspondence between the 32-bit short identifier and IPv6.

The embodiment specifically includes the following operations S601 to S603.

At S601, a node advertises SRv6 compression capability.

At S602, the node advertises a mapping relationship between the compressed SRv6 SID and IPv6 through an IGP protocol according to the method provided in the embodiment of the present disclosure.

At S603, other nodes propose a mapping table based on the received mapping relationship, thereby obtaining a correspondence relationship between the 32-bit short identifier and IPv6.

In a third aspect, an embodiment of the present disclosure further provides a node configured to implement any one of the information sending methods described above.

Figure 7:
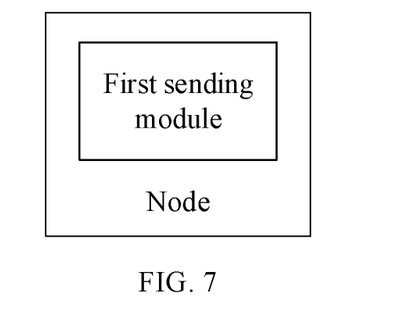
FIG. 7 is a block diagram of a node according to an embodiment of the present disclosure.

Referring to FIG. 7, the node according to the embodiment of the present disclosure includes:

a first sending module configured to send capability advertisement information, wherein the capability advertisement information is used for indicating a capability of the node to support compressed SRv6 SIDs.

It will be appreciated that in fact, the node in this embodiment of the present disclosure may be any node in an SRv6 network. In other words, each node can perform the operation of sending capability advertisement information, and can receive the capability advertisement information sent from another node.

Figure 8:
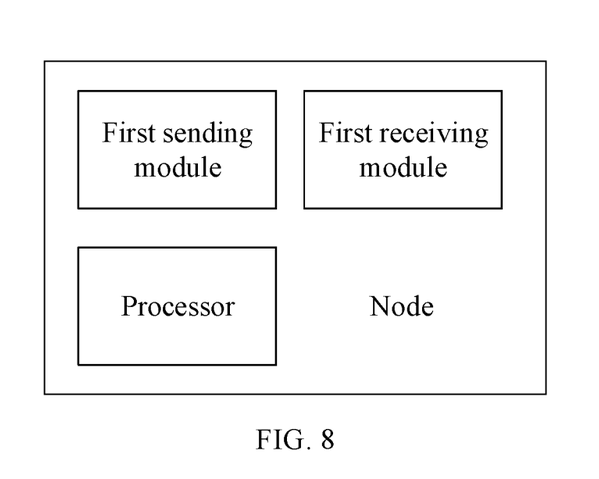
FIG. 8 is a block diagram of another node according to an embodiment of the present disclosure.

Referring to FIG. 8, in some embodiments, the node further includes:

a first receiving module configured to receive SID information sent from a controller; the SID information including SRv6 SID information; and one or more processors configured to encapsulate an SRH according to the SID information.

In a fourth aspect, an embodiment of the present disclosure further provides a controller configured to implement any one of the information processing methods described above.

Figure 9:
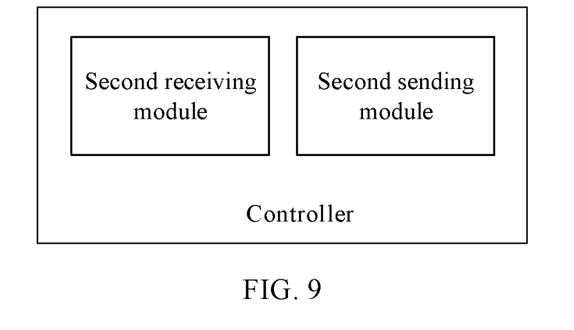
FIG. 9 is a block diagram of a controller according to an embodiment of the present disclosure.

Referring to FIG. 9, the controller in the embodiment of the present disclosure includes:

a second receiving module configured to receive capability advertisement information sent from a node; wherein the capability advertisement information is used for indicating a capability of the node to support compressed SRv6 SIDs; and a second sending module configured to send SID information; the SID information including SRv6 SID information.

Figure 10:
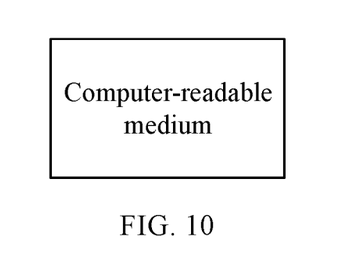
FIG. 10 is a block diagram of a non-transitory computer-readable storage medium according to an embodiment of the present disclosure.

In a fifth aspect, referring to FIG. 10, an embodiment of the present disclosure provides a non-transitory computer-readable storage medium storing a computer program thereon which, when executed by a processor, causes any one of the information sending methods described above to be implemented.

In a sixth aspect, referring to FIG. 10, an embodiment of the present disclosure provides a non-transitory computer-readable storage medium storing a computer program thereon which, when executed by a processor, causes any one of the information processing methods described above to be implemented.

The processor is a device with a data processing capability, including but not limited to a central processing unit (CPU) or the like. The memory is a device with a data storage capability, including but not limited to a random access memory (RAM, more specifically SDRAM, DDR or the like), a read-only memory (ROM), an electrically erasable programmable read-only memory (EEPROM), or a flash. The I/O interface (read/write interface) is connected between the processor and the memory to realize information interaction between the memory and the processor, and includes, but is not limited to, a data bus or the like.

Those of ordinary skill in the art will appreciate that all or some operations, functional modules/units in the system and apparatus disclosed above may be implemented as software, firmware, hardware, and suitable combinations thereof.

In a hardware implementation, the division between the functional modules/units mentioned in the above description does not necessarily correspond to the division of physical components; for example, one physical component may have multiple functions, or one function or operation may be performed cooperatively by several physical components.

Some or all physical components may be implemented as software executed by a processor, such as a CPU, a digital signal processor or microprocessor, or implemented as hardware, or implemented as an integrated circuit, such as an application specific integrated circuit. Such software may be distributed on a computer readable medium which may include a computer storage medium (or non-transitory medium) and communication medium (or transitory medium). The term computer storage media includes volatile and nonvolatile, removable and non-removable media implemented in any method or technology for storage of information such as computer readable instructions, data structures, program modules or other data, as is well known to those of ordinary skill in the art. The computer storage medium includes, but is not limited to, a random access memory (RAM, more specifically SDRAM, DDR or the like), a read-only memory (ROM), an electrically erasable programmable read-only memory (EEPROM), a flash, or any other magnetic disk storage; a compact disk read-only memory (CD-ROM), a digital versatile disk (DVD), or any other optical disk storage; a magnetic cassette, a magnetic tape, a magnetic disk memory or any other magnetic storage; or any other medium which can be used to store the desired information and accessed by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, as would be apparent to one skilled in the art, features, characteristics and/or elements described in connection with a particular embodiment may be used alone or in combination with features, characteristics and/or elements described in connection with another embodiment, unless expressly stated otherwise. It will, therefore, be understood by those skilled in the art that various changes in form and details may be made therein without departing from the scope of the present disclosure as set forth in the appended claims.

What is claimed is:

1. An information sending method, applied to a node, the method comprising:
   sending capability advertisement information, wherein the capability advertisement information is used for indicating a capability of the node to support compressed segment routing over IPv6 (SRv6) segment Identifiers (SIDs),
   wherein the capability of the node to support compressed SRv6 SIDs comprises:
   an SRv6 SID compression type supported by the node and represented by a compressed length of the SRv6 SID.

2. The method according to claim 1, wherein the capability of the node to support compressed SRv6 SIDs further comprises at least one of:
   support to compressed SRv6 SIDs by the node; or
   a correspondence relationship between SRv6 SID block information and SRv6 types.

3. The method according to claim 1, wherein sending the capability advertisement information comprises:
   sending the capability advertisement information according to any one of Interior Gateway Protocol (IGP), Border Gateway Protocol (BGP), a Path Computation Element Communication Protocol (PCEP), or Border Gateway-Link State Protocol (BGP-LS).

4. The method according to claim 1, wherein the capability advertisement information comprises at least one of:
   a compression capability flag;
   an SRv6 compression capability type-length-value (TLV); or
   an SRv6 compression capability sub-TLV.

5. The method according to claim 1, wherein sending the capability advertisement information comprises sending the capability advertisement information according to Intermediate System to Intermediate System (ISIS) protocol; the capability advertisement information comprises at least one of:
   a compression capability flag in an SRv6 capability sub-TLV of a routing capability TLV; or
   an SRv6 compression capability sub-TLV of the routing capability TLV.

6. The method according to claim 1, wherein sending the capability advertisement information comprises sending the capability advertisement information according to an Open Shortest Path First (OSPF) protocol; the capability advertisement information comprises at least one of:
   a compression capability flag in an SRv6 capability TLV of an OSPFv3 Router Information LSA; or
   an SRv6 compression capability sub-TLV in the SRv6 capability TLV of the OSPFv3 Router Information LSA.

7. The method according to claim 1, wherein sending the capability advertisement information comprises sending the capability advertisement information according to BGP-LS; and wherein the capability advertisement information comprises at least one of:
   a compression capability flag in an SRv6 capability TLV of an SRv6 node attribute; or
   an SRv6 compression capability sub-TLV in the SRv6 capability TLV of the SRv6 node attribute.

8. The method according to claim 1, wherein sending the capability advertisement information comprises: sending the capability advertisement information according to PCEP; wherein
the capability advertisement information comprises at least one of: a compression capability flag in an SRv6 path computation element capability sub-TLV of an Open message; or an SRv6 compression capability sub-TLV of the Open message;
or,
a stateful path computation element request parameters object comprises a compressed path ID that is used for indicating a path establishment type as a compressed SRv6 SID path.

9. The method according to claim 1, wherein after sending the capability advertisement information, the method further comprises:
receiving SID information sent from a controller; wherein the SID information comprises SRv6 SID information; and
encapsulating a segment routing header according to SID information.

10. The method according to claim 9, wherein
the SID information comprises SRv6 SIDs and corresponding compression related information; and
encapsulating the segment routing header according to the SID information comprises: determining, according to the capability advertisement information, the SRv6 SIDs and the corresponding compression related information, whether to encapsulate a segment routing header with at least some of the SRv6 SIDs compressed.

11. The method according to claim 10, wherein determining whether to encapsulate the segment routing header with at least some of the SRv6 SIDs compressed comprises:
determining, in a case that there are a plurality of SRv6 SIDs in a same block and of a same compressed length, to encapsulate a segment routing header with the plurality of SRv6 SIDs compressed;
or,
determining, in a case that there are a plurality of SRv6 SIDs in a same block, to encapsulate a segment routing header with the plurality of SRv6 SIDs compressed.

12. The method according to claim 9, wherein
the SID information comprises compressed SRv6 SIDs; and
encapsulating the segment routing header according to the SID information comprises: encapsulating the segment routing header according to at least the compressed SRv6 SIDs.

13. An information processing method, applied to a controller, the method comprising:
receiving capability advertisement information sent from a node; wherein the capability advertisement information is used for indicating a capability of the node to support compressed SRv6 SIDs, wherein the capability of the node to support compressed SRv6 SIDs comprises: an SRv6 SID compression type supported by the node and represented by a compressed length of the SRv6 SID; and
sending SID information; wherein the SID information comprises SRv6 SID information and corresponding compression related information.

14. The method according to claim 13, wherein the compression related information comprises at least one of:
a compression indication;
a location of a start SRv6 SID from which the compression information is changed;
a location of an end SRv6 SID till which the compression information is changed;
a block length of a locator of each SRv6 SID network node;
a node ID length of a locator of each SRv6 SID network node;
a compressed length of each SRv6 SID; or
a compression correspondence relationship of each SRv6 SID; wherein the compression correspondence relationship of the SRv6 SID is a correspondence relationship between the block length of the locator of the SRv6 SID network node and the compressed length.

15. The method according to claim 14, wherein compression related information comprises at least one of the following carried in each SRv6 SID:
a block length of a locator of the SRv6 SID network node;
a node ID length of the locator of the SRv6 SID network node;
a compressed length of the SRv6 SID; or
a compression correspondence relationship of the SRv6 SID.

16. The method according to claim 13, wherein before sending the SID information, the method further comprises:
determining an SRv6 path;
compressing at least some of the SRv6 SIDs in the SRv6 path; and
wherein sending the SID information comprises: sending compressed SID information with the compressed SRv6 SIDs.

17. A non-transitory computer-readable storage medium storing a computer program thereon which, when executed by a processor, causes the information sending method according to claim 1 to be implemented.

18. A node configured to:
send capability advertisement information, wherein the capability advertisement information is used for indicating a capability of the node to support compressed SRv6 segment IDs (SIDs),
wherein the capability of the node to support compressed SRv6 SIDs comprises:
an SRv6 SID compression type supported by the node and represented by a compressed length of the SRv6 SID.

19. A controller comprising a processor and a non-transitory computer-readable storage medium storing a computer program thereon which, when executed by the processor, causes the information processing method according to claim 13 to be implemented.

* * * * *